L. F. LEMON & J. C. STOOPS.
STOCK RELEASER.
APPLICATION FILED MAY 22, 1909.

942,875.

Patented Dec. 7, 1909.
2 SHEETS—SHEET 1.

Witnesses
Chas C Richardson
C. H. Woodward.

Inventors
Louis F. Lemon and
John C. Stoops,
By
Attorneys.

L. F. LEMON & J. C. STOOPS.
STOCK RELEASER.
APPLICATION FILED MAY 22, 1909.

942,875.

Patented Dec. 7, 1909.
2 SHEETS—SHEET 2.

Witnesses
Chas. C. Richardson.
C. N. Woodward.

Inventors
Louis F. Lemon and
John C. Stoops,
By Chandler & Chandler.
Attorneys

UNITED STATES PATENT OFFICE.

LOUIS F. LEMON AND JOHN C. STOOPS, OF NEODESHA, KANSAS; SAID STOOPS ASSIGNOR OF ONE-THIRD OF HIS RIGHT TO SAID LEMON.

STOCK-RELEASER.

942,875.

Specification of Letters Patent.

Patented Dec. 7, 1909.

Application filed May 22, 1909. Serial No. 497,761.

*To all whom it may concern:*

Be it known that we, LOUIS F. LEMON and JOHN C. STOOPS, citizens of the United States, residing at Neodesha, in the county of Wilson, State of Kansas, have invented certain new and useful Improvements in Stock-Releasers; and we do hereby declare the following to be a full, clear, and exact description of the invention, such as will enable others skilled in the art to which it appertains to make and use the same.

This invention relates to devices employed in stables and like localities for the instantaneous release of stock when required, for instance in case of a fire, and has for one of its objects to improve the construction and increase the efficiency and utility of devices of this character.

Figure 1:
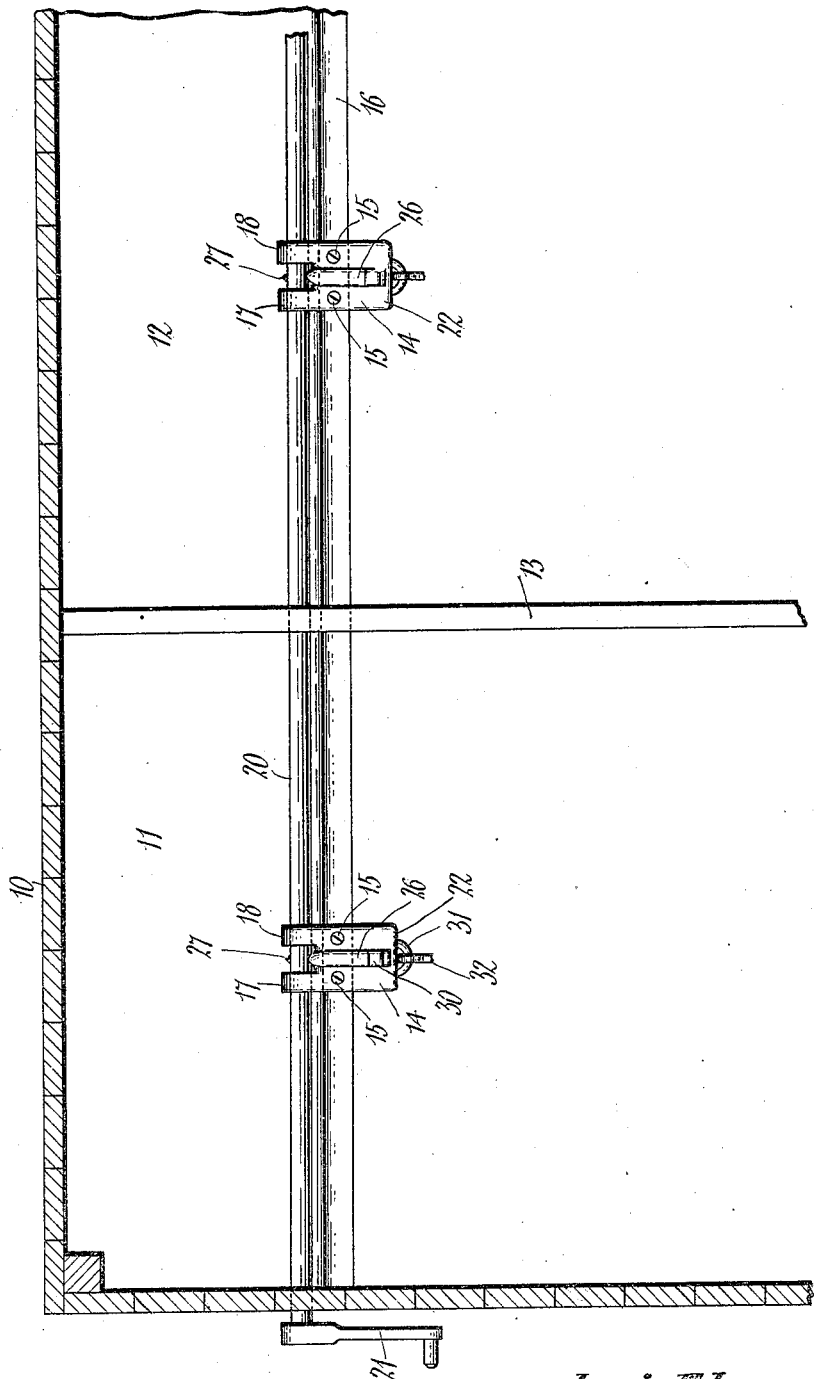
Figure 2:
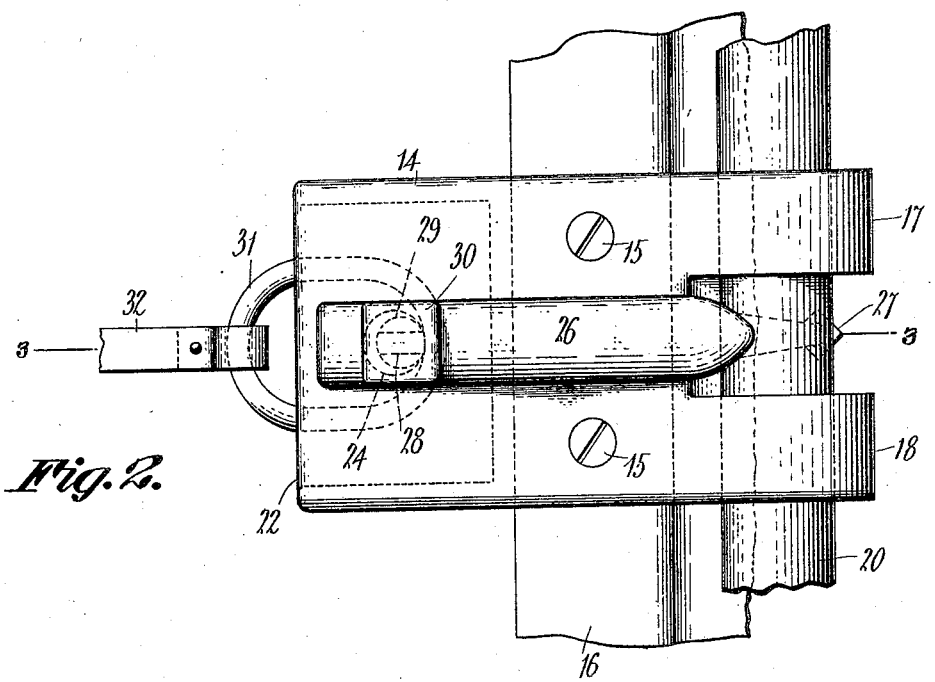
Figure 3:
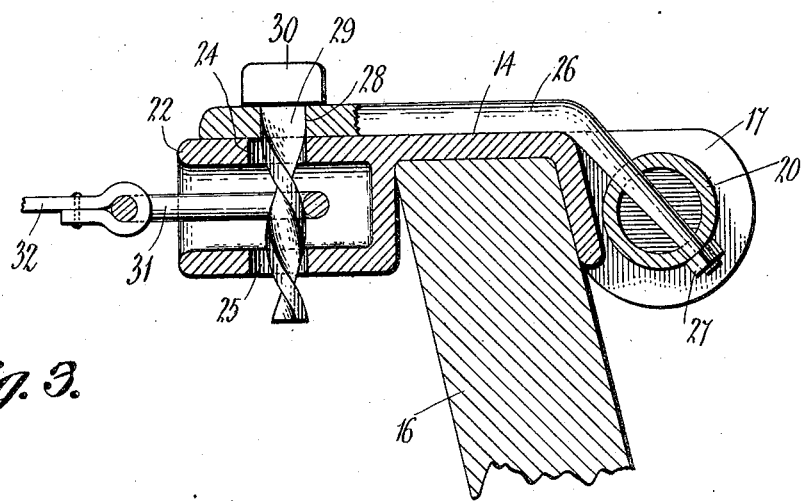

With this and other objects in view, the invention consists in certain novel features of construction as hereafter shown and described and then specifically pointed out in the claims, and in the drawings illustrative of the preferred embodiment of the invention, Figure 1 is a sectional view of a portion of a stable including two of the stalls with the improvement applied. Fig. 2 is a plan view enlarged of one of the releasing devices. Fig. 3 is a section on the line 3—3 of Fig. 2.

The improved device may be applied without material structural changes to stables and like structures of any required size or form, and is generally applied to the mangers, and for the purpose of illustration is shown thus applied.

The section of a stable is represented at 10 with two mangers 11—12 divided by the usual partitions 13.

One of the improved devices will be located in each stall, and upon each manger, and as the devices are precisely alike the description of one will suffice for all.

The improved device consists of a base or body 14 connected by screws or other fastening devices 15 to the upper edge of the front member 16 of the manger, and extends beyond the same at each side. The member 14 is provided at one side with spaced ears 17—18 through which an operating rod 20 passes, the latter preferably being formed of a section of gas pipe, which combines strength and lightness. The member 20 extends through one wall of the stable 10 and is provided with operating means such as a handle 21 upon the outer end so that the rod may be rotated from the exterior of the stable. Extending from the opposite end of the member 14 from the ears 17 is a socket 22 having vertically alining apertures 24—25 extending through the socket, as shown in Fig. 3.

Connected to the tubular member 20 between each pair of ears 17—18 is an arm 26, the arm preferably extending at one end through the tubular member and connected thereto by a nut 27 or other suitable fastening means. The arm 26 extends over the socket 22 and lies thereon when in normal position, as shown. The arm 26 is provided near its free end with a longitudinal slot 28, the slot being located in registering position relative to the apertures 24—25. Loosely disposed in the slot 28 is a pin 29 having an enlarged head 30 bearing upon the arm 26, and thereby limiting the downward movement of the pin.

The pin 29 is formed with one or more twists as shown in Fig. 3, and fits through the slot 28 with sufficient looseness to enable it to be moved upwardly through the slot when simultaneously rotated and drawn upwardly, but it will not move upwardly through the slot 28 when the rotary movement is omitted. The pin 29 extends downwardly through the slot 28 into the apertures 22, and thus extends across the socket 22, and fitting in this socket and around the pin 29 is a ring 31 which is connected to the hitching strap, a portion of which is represented at 32. By this simple means each animal is hitched to its manger, and so long as the rod 20 is not rotated, will remain thus hitched, but in event of a fire the rotation of the tubular member 20 by operating the handle 21 will simultaneously elevate the various arms 26 carrying the pins 29 with them and releasing the rings 31, and thus releasing the stock, so that they can escape from the burning building.

If one or more of the animals are to be released the attendant simply elevates the pin 29 by grasping the head 30 and rotating the pin at the same time that he moves the pin upward, the twists of the pin permitting this movement, as will be understood. The pins 29 being arranged for removal only by a combined rotary and lifting movement the animal will not be able to release itself by pulling upwardly upon the pin, as would be liable to happen if the pins were simply straight rods and without the twist feature. The twist feature is thus an important feature of the invention, and adds materially to its value and utility. As many of the improved devices may be applied in connection with any one member 20, as required and it is not desired therefore to limit the invention to any specific number of the devices.

The member 14 together with its ears 17—18 and the socket 24 is preferably formed from a single casting. All of the parts of the improved device are of metal, and preferably galvanized or otherwise coated or protected to prevent corrosion.

What is claimed is:—

1. A device of the class described comprising a body member having a socket, an arm swingingly connected to said member and provided with a slot, and a twisted pin movable in said slot and extending through said socket, said pin adapted to support a halter ring within the socket.

2. A device of the class described comprising a body member having a socket, an arm swingingly connected to said member and provided with a slot, a twisted pin movable in said slot and extending through said socket, said pin adapted to support a halter ring within the socket, and means for operating said arm.

3. A device of the class described comprising a body member having a socket, an operating member mounted for rotation, an arm connected to said operating member and provided with a slot, a twisted pin movable in said slot and extending through said socket, said pin adapted to support a halter ring within the socket, and means for actuating said operating member.

4. The combination with a plurality of mangers of an operating member mounted for rotation, a body member connected to each manger and each body provided with a socket, an arm for each of said bodies and connected to said operating member, each arm having a longitudinal slot, a twisted pin movably engaging each of said slots and extending through one of said sockets, each of said pins being adapted to support a halter ring in one of the sockets, and means for actuating said operating member.

5. A device of the class described comprising a body member having a socket at one end and spaced ears at the other end, an operating member extending through said ears, an arm connected at one end to said operating member between said ears and with a slot at the free end, and a twisted pin movable in said slot and extending through said socket, said pin adapted to support a halter ring within the socket.

In testimony whereof, we affix our signatures in presence of two witnesses.

LOUIS F. LEMON.
JOHN C. STOOPS.

Witnesses:
J. D. NICHOLS,
H. C. MEINEKE.